(12) United States Patent
Jaycox et al.

(10) Patent No.: US 9,011,975 B2
(45) Date of Patent: Apr. 21, 2015

(54) TREATMENT OF FILAMENTS OR YARN

(71) Applicants: Gary Delmar Jaycox, West Chester, PA (US); Eric Diaz Felton, Elkton, MD (US)

(72) Inventors: Gary Delmar Jaycox, West Chester, PA (US); Eric Diaz Felton, Elkton, MD (US)

(73) Assignee: E I du Pont de Nemours and Company, Wilmington, DE (US)

( * ) Notice: Subject to any disclaimer, the term of this patent is extended or adjusted under 35 U.S.C. 154(b) by 341 days.

(21) Appl. No.: 13/673,379

(22) Filed: Nov. 9, 2012

(65) Prior Publication Data

US 2014/0130977 A1 May 15, 2014

(51) Int. Cl.
| | | |
|---|---|---|
| *B05D 1/36* | (2006.01) | |
| *C09J 5/02* | (2006.01) | |
| *B05D 1/38* | (2006.01) | |
| *B05D 5/10* | (2006.01) | |
| *C09J 5/06* | (2006.01) | |
| *D06M 15/55* | (2006.01) | |
| *D06M 15/564* | (2006.01) | |
| *D06M 15/693* | (2006.01) | |

(52) U.S. Cl.
CPC ... *C09J 5/02* (2013.01); *B05D 1/38* (2013.01); *B05D 1/36* (2013.01); *B05D 5/10* (2013.01); *C09J 5/06* (2013.01); *C09J 2400/263* (2013.01); *C09J 2400/266* (2013.01); *C09J 2421/006* (2013.01); *D06M 15/55* (2013.01); *D06M 15/564* (2013.01); *D06M 15/693* (2013.01)

(58) Field of Classification Search
None
See application file for complete search history.

(56) References Cited

U.S. PATENT DOCUMENTS

| | | |
|---|---|---|
| 2,128,635 A | 8/1938 | Charch et al. |
| 3,094,511 A | 6/1963 | Hill, Jr. |
| 3,307,966 A | 3/1967 | Shoaf |
| 3,354,127 A | 11/1967 | Hill, Jr. et al. |
| 3,673,143 A | 6/1972 | Bair et al. |
| 3,767,756 A | 10/1973 | Blades |
| 3,819,587 A | 6/1974 | Kwoleck |
| 3,869,429 A | 3/1975 | Blades |
| 3,869,430 A | 3/1975 | Blades |
| 4,172,938 A | 10/1979 | Mera et al. |
| 6,740,710 B1 | 5/2004 | Wick |
| 2003/0176561 A1* | 9/2003 | Joshi et al. ............ 524/494 |
| 2009/0142572 A1 | 6/2009 | Burlett |
| 2011/0129647 A1* | 6/2011 | Duke et al. ............ 428/156 |

FOREIGN PATENT DOCUMENTS

| | | |
|---|---|---|
| EP | 0537462 | 4/1993 |
| JP | 2011111563 | 6/2011 |

OTHER PUBLICATIONS

PCT International Search Report and Written opinion for International Application No. PCT/US2013/067996 Dated Jul. 4, 2014.
W.B. Black and J. Preston, Fiber-Forming Aromatic Polyamides, Man-Made Fibers—Science and Technology, vol. 2, p. 297, Interscience Publishers, 1968.

\* cited by examiner

Primary Examiner — Erma Cameron

(57) ABSTRACT

A method for treating an aromatic polyamide filament or yarn to improve its adhesion to rubber wherein, the method comprises exposing the filament or yarn to a first mixture of reagents comprising multi-functional isocyanate oligomers and multi-functional epoxy oligomers, wherein the ratio of total isocyanate groups to total epoxy groups in the mixture is in the range of from 0.8 to 1.2, and heating the exposed filament or yarn to a temperature of at least 100 degrees C. whereby the epoxy and isocyanate oligomers cross-link and form a network on the surface of the filament or yarn.

5 Claims, No Drawings

TREATMENT OF FILAMENTS OR YARN

BACKGROUND

1. Field of the Invention

This invention is in the field of aromatic polyamide or aromatic copolyamide filaments or yarns and the adhesion of such filaments or yarns to rubber, elastomer or resin.

2. Description of the Related Art

Para-aramid fibers are widely used as a structural reinforcement in tires and mechanical rubber goods. A coating is frequently applied to the fiber to assist the adhesion of the rubber or elastomer to the fiber. Such coatings are normally based on epoxy or isocyanate type resins or various resorcinol-formaldehyde latex (RFL) mixtures. The widely used RFL adhesion system requires a two step process. In some embodiments, the coating material is an epoxy resin subcoat and a resorcinol-formaldehyde topcoat. Chemical bonding to rubber occurs via double bonds that are introduced onto the fiber surface. The double bonds serve as rubber-cure sites that eventually co-cure into the rubber matrix.

U.S. Pat. No. 2,128,635 describes the RFL process. U.S. Pat. No. 3,307,966 describes the use of a phenol blocked isocyanate-epoxy coating for a pre-dip formulation.

For industrial hygiene reasons, there is a requirement to reduce, and preferably eliminate, the use of both resorcinol and formaldehyde in rubber goods manufacturing. There is, therefore, a need to find alternative environmentally friendly adhesion promotion compounds to enhance the effectiveness of the bond strength between the fiber and the rubber, preferably by a one step process. Examples of rubber goods where such a process can be used is in the manufacture of power transmission belts, conveyor belts, tires and hoses. Another field of use is in fiber reinforced composites where appropriate fiber treatment can reduce delamination within the layers of the composite.

SUMMARY OF THE INVENTION

This invention pertains to a method for treating a synthetic or natural fibrous filament or yarn to improve its adhesion to rubber, elastomer or resin wherein, the method comprises:
(a) exposing the filament or yarn to a first mixture of reagents comprising first multi-functional isocyanate oligomers and first multi-functional epoxy oligomers, wherein the ratio of total isocyanate groups to total epoxy groups in the first mixture is in the range of from 0.8 to 1.2, and
(b) heating the exposed filament or yarn at a temperature of at least 100 degrees C. whereby the first epoxy oligomers and first isocyanate oligomers cross-link and form a network on the surface of the filament or yarn, with the proviso that the double bonds present in the first epoxy and first isocyanate oligomers do not participate in the crosslinking reaction.

The invention further pertains to a method for treating a synthetic or natural fibrous filament or yarn to improve its adhesion to rubber, elastomer or resin wherein, the method comprises:
(a) exposing the filament or yarn to a first mixture of reagents comprising first multi-functional isocyanate oligomers and first multi-functional epoxy oligomers, wherein the ratio of total isocyanate groups to total epoxy groups in the first mixture is in the range of from 0.8 to 1.2, and
(b) heating the exposed filament or yarn at a temperature of at least 100 degrees C. whereby the first epoxy oligomers and first isocyanate oligomers cross-link and form a network on the surface of the filament or yarn,
(c) exposing this treated filament or yarn to a second mixture of reagents comprising second multi-functional isocyanate oligomers and second multi-functional epoxy oligomers wherein the ratio of total isocyanate groups to total epoxy groups in the second mixture is in the range of from 0.8 to 1.2, and
(d) heating the exposed filament or yarn at a temperature of at least 100 degrees C. whereby the second epoxy oligomers and the second isocyanate oligomers cross-link and form a network on the outer surface of the network formed by the first epoxy and first isocyanate oligomers, with the proviso that the double bonds present in the second epoxy and second isocyanate oligomers do not participate in the crosslinking reaction.

DETAILED DESCRIPTION

Filaments and Yarns

For purposes herein, the term "filament" is defined as a relatively flexible, macroscopically homogeneous body having a high ratio of length to width across its cross-sectional area perpendicular to its length. The filament cross section can be any shape, but is typically circular or bean shaped. Herein, the term "fiber" is used interchangeably with the term "filament".

The filaments can be any length. Preferably the filaments are continuous. A multifilament yarn contains a plurality of continuous filaments. A yarn is frequently spun onto a bobbin in a package. The multifilament yarn can be cut into staple fibers and made into a spun staple yarn suitable for use in the present invention. The staple fiber can have a length of about 1.5 to about 5 inches (about 3.8 cm to about 12.7 cm). The staple fiber can be straight (i.e., non-crimped) or crimped to have a saw tooth-shaped crimp along its length, with a crimp (or repeating bend) frequency of about 3.5 to about 18 crimps per inch (about 1.4 to about 7.1 crimps per cm).

In some embodiments, the yarns have a yarn tenacity of at least 7.3 grams per dtex and a modulus of at least 100 grams per dtex. Preferably, the yarns have a linear density of 50 to 4500 dtex, a tenacity of 10 to 65 g/dtex, a modulus of 150 to 2700 g/dtex, and an elongation to break of 1 to 8 percent. More preferably, the yarns have a linear density of 100 to 3500 dtex, a tenacity of 15 to 50 g/dtex, a modulus of 200 to 2200 g/dtex, and an elongation to break of 1.5 to 5 percent. The corresponding mechanical strength values of a filament are normally marginally higher than those of a yarn made from the filaments.

The filaments or yarns may be of synthetic fiber, natural fiber or combinations thereof. Suitable synthetic fibers are aromatic polyamide, aromatic copolyamide, aliphatic polyamide or polyester. Suitable aliphatic polyamides include polyamide-6; polyamide-6,6; polyamide-6,10; polyamide-6,12; polyamide-11; polyamide-12. Suitable natural fibers include cotton or cellulose.

A preferred aromatic polyamide is para-aramid. The term "aramid" means a polyamide wherein at least 85% of the amide (—CONH—) linkages are attached directly to two aromatic rings. Suitable aramid fibers include Twaron®, Sulfron®, Technora® all available from Teijin Aramid, Heracon™ from Kolon Industries Inc. or Kevlar® available from DuPont. Aramid fibers are described in Man-Made Fibres—Science and Technology, Volume 2, Section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

One preferred para-aramid is poly (p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloro-terephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Another suitable fiber is one based on aromatic copolyamide which may be prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers.

Preferred polyester yarns are aromatic polyester. Polyethylene terephthalate (PET) or polyethylene naphthalate (PEN) are suitable polyester materials. A suitable cellulosic yarn is a regenerated cellulose or rayon such as those available under the tradenames Lyocell or Tencel.

Adhesion Promotion Agents

The filaments or yarns are coated to promote their adhesion to rubber. In some embodiments the coating comprises from 0.1 to 25 or from 1 to 20 or even from 2 to 15 weight percent of the yarn plus coating.

In one embodiment, the uncured adhesion promoting coating is a mixture (a first mixture) of reagents comprising first multi-functional isocyanate oligomers and first multi-functional epoxy (oxirane) oligomers, wherein the ratio of total isocyanate groups to total epoxy groups in the first mixture is in the range of from 0.8 to 1.2. Any suitable multi-functional epoxy and isocyanate can be used. Exemplary materials include glycidyl glycerol ether, 4,4'-methylene diphenyl diisocyanate (MDI), or more complex multi-functional epoxy and/or isocyanate building-blocks that possess higher double bond contents. For example, Krasol® LBD di-isocyanate (commercially available from Cray Valley USA LLC, Exton, Pa.) is ideally suited for these purposes. Krasol® LBD di-isocyanate reagent is formed from an oligomer of butadiene and is the building block that supplies the double bonds that do not participate in crosslinking reactions but are needed as rubber cure-sites. Mono-functional epoxy and/or isocyanate monomers that contain other useful functional groups that do not participate in the crosslinking reactions can also be added in small quantites (<10 mol %) to this mixture of reagents. Exemplary materials include monomers like 1,2-epoxy-9-decene and allyl isocyanate (both commercially available from Sigma-Aldrich, St. Louis, Mo.)

In some embodiments, especially for application of only a single coating, a blend of glycidyl glycerol ether, 4,4'-methylene diphenyl diisocyanate (MDI) and Krasol® LBD di-isocyanate is used.

In another embodiment, after a first mixture of reagents has been crosslinked, a second mixture of uncured coating reagents is applied to the outer surface of the filaments or yarns previously treated with the first mixture, the second mixture of reagents comprising second multi-functional isocyanate oligomers and second multi-functional epoxy oligomers wherein the ratio of total isocyanate groups to total epoxy groups in the second mixture is in the range of from 0.8 to 1.2. In one example of this type, the first coating layer is formed from glycidyl glycerol ether and MDI. This gives a relatively "hard" network with high crosslink density that mimics the hardness of the adjacent fiber surface. The second (outer) layer coating is formed from glycidyl glycerol ether and Krasol® LBD di-isocyanate or from a mixture of all three reagents (i.e., glycidyl glycerol ether, Krasol® LBD di-isocyanate and MDI). This second outer layer will be softer, mimicking the rubber interface that it will ultimately encounter.

The composition of the first and second mixtures may be different. The sequential application of two (or more) oxazolidone network structures on the fiber or yarn surface provides for a compositional gradient perpendicular to the fiber or yarn's central axis. Such a gradient structure permits the optimization of the different interfaces (fiber surface-to-network and network-to-rubber) further affording improvements in adhesion performances. The first mixture is formulated to have a greater affinity for the fibrous material while the second mixture is formulated to have a greater affinity for rubber.

The multi-functional isocyanate oligomers of the first and second mixtures contain two or more isocyanate functional groups. The multi-functional epoxy oligomers of the first and second mixtures contain two or more epoxide rings. In some embodiments, the first and second multi-functional isocyanate oligomers of the first and second mixtures are different. In some other embodiments, the first and second epoxy oligomers of the first and second mixtures are different. In yet another embodiment, both the first and second multi-functional isocyanate oligomers of the first and second mixtures and the first and second epoxy oligomers of the first and second mixtures are different.

It has been found that the previously coated filaments or yarns can be coated with a catalyst, which can be beneficial. Any suitable catalyst such as an amine catalyst may be used, suitable examples being DABCO (1,4-diazabicyclo[2.2.2] octane) and dicyclohexyl ethyl amine, tributyl amine.

The oxazolidone and/or isocyanurate networks thus formed are endowed with multiple hydrogen-bond acceptor sites that allow for cooperative bonding interactions with the polar polyamide or copolyamide filament surface. Thus, when such materials like those described above are added to "standard" oxirane and isocyanate reagents already employed in the currently conventional RFL pre-dip formulation, new network structures become possible. The polybutadiene segments in these new network structures furnish high local concentrations of double bonds that can chemically co-cure into the rubber matrix. The polybutadiene-like environments surrounding the fiber surface are also advantageous in that they are physically compatible with the rubber phase. Thus, good interpenetration of the network into the rubber layer is possible before co-cure takes place and high levels of chemical bonding between fiber and rubber are therefore achievable.

The crosslinking reaction (cure-step) within the mixture of epoxy and isocyanate reagents proceeds via the formation of oxazolidone rings (epoxy+iso) and isocyanurate rings (iso trimerization). The relative rates of each depend upon many factors such as iso-epoxy stoichiometry, reaction temperature and choice of catalyst.

Other reagents containing reactive amine, hydroxyl or other chemical groups can also be employed as suitable building-blocks as long as they are capable of co-reacting into the nascent network structures to aid in crosslink development on the polyamide or copolyamide fiber surfaces. For example, amine-containing reagents will react with both the isocyanate and oxirane building-blocks already described to ultimately furnish more complex network architectures that are endowed with different chemical and physical attributes. Co-reagents that form interpenetrating network structures are also possible and these will provide for further performance advantages.

Such compositions, as described above, eliminate the need for a pre-dip as is required by current RFL technology.

Cords and Fabrics

The filaments or yarns are frequently formed into a cord or fabric for use in tires, belts and hoses. Typically, a cord is a twisted or formed structure composed of two or more filaments or yarns. A common form of cord is one in which the filaments or yarns are all aligned in the same direction. This is sometimes known as a unidirectional structure or ply. Alternatively the filaments or yarns may be in the form of a fabric. The fabrics may be woven, may be unidirectional, with or without binder, may be multiaxial with layers of filaments or yarn in different orientations or may be three-dimensional. Each of these fabric styles is well known in the art. The adhesion-promoting coating may be applied to the cord or fabric before or after the cord or fabric is formed.

Rubber and Elastomer

As used herein, the terms "rubber", and "elastomer" may be used interchangeably, unless otherwise provided. The terms "rubber composition", "compounded rubber" and "rubber compound" may be used interchangeably to refer to "rubber which has been blended or mixed with various ingredients and materials" and such terms are well known to those having skill in the rubber mixing or rubber compounding art. The terms "cure" and "vulcanize" may also be used interchangeably Suitable elastomers for the present invention include both natural rubber, synthetic natural rubber and synthetic rubber. Synthetic rubber compounds can be any which are dissolved by common organic solvents and can include, among many others, polychloroprene and sulfur-modified chloroprene, hydrocarbon rubbers, butadiene-acrylonitrile copolymers, styrene butadiene rubbers, chlorosulfonated polyethylene, fluoroelastomers, polybutadiene rubbers, polyisoprene rubbers, butyl and halobutyl rubbers and the like. Natural rubber, styrene butadiene rubber, polyisoprene rubber and polybutadiene rubber are preferred. Mixtures of rubbers may also be utilized.

Curing of the elastomer into the final shape takes place in a hot mold. Cure temperature and curing time will vary for different product types and elastomer formulations but typical values are a cure temperature of about 150 to 180 degrees centigrade with a curing time from about 12 to 25 minutes. For large articles, the cure time can be much longer. During the curing of the un-cured rubber in which the filaments or yarns are heated, the networks of double bonds of the first and second reagent mixtures coated onto the surface of the filaments or yarns co-cure into the rubber matrix.

Fiber Reinforced Composites

Fiber reinforced composites comprise reinforcement yarns or tows that are impregnated with a matrix resin. Suitable yarns or tows include p-aramid, carbon, glass and ceramic. A range of natural fibers such as cotton, flax, sisal, kenaf and jute are finding increasing applications in fiber reinforced materials. The reinforcement may be a woven fabric, a unidirectional or non-crimped fabric, a scrim or a nonwoven fabric. By nonwoven is meant a fabric in which the filaments or yarns are in a random orientation.

The resin matrix may be thermoset or thermoplastic. Exemplary thermoset resins include epoxy, phenolic, cyanate ester and bismaleimide resins. The resin content is typically from about 25 to 40 weight percent of the weight of fiber plus resin.

Method for Treating the Filament or Yarn

For formulations containing a combination of isocyanate and oxirane reagents but no catalyst, crosslinking can be triggered thermally, for example above 150 degrees C. In some embodiments, the complete formulation pre-dissolved in an organic solvent such as methylethylketone (MEK), tetrahydrofuran or 1,4 dioxane can be applied to the fiber or yarn in a single pass at room temperature. The amount of solvent can be from 20 to 50% although other amounts are also possible. For reagents that are non-viscous liquids, lower amounts of solvent may be used, and in some instances, it might even be possible to avoid solvent all together. The more concentrated the solution, the "thicker" the coating ultimately applied to the fiber.

Heating the coated fiber will trigger network formation along with the evaporation of the solvent. Isocyanates can be used in unblocked or in blocked (protected) form. Use of blocked isocyanates such as Grilbond® IL-6 from EMS-Chemie, Sumter, S.C. allows for aqueous-based formulations where water serves to disperse the blocked isocyanate and oxirane reagents. In this case, no organic solvent is required. Oxazolidone network formation can also be triggered catalytically at room temperature using un-blocked isocyanate and oxirane reagents. In this case, the catalyst (typically a hindered tertiary amine like DABCO (1,4-diazabicyclo[2.2.2]octane)) can be applied to the fiber surface first with the subsequent application of the reagent mix using a two-dip process. Alternately, the order of addition could be reversed on the fiber surface.

In one embodiment, a method for treating a synthetic or natural fibrous filament or yarn to improve its adhesion to rubber, elastomer or resin comprises the steps of:

(a) exposing the filament or yarn to a mixture of reagents comprising multi-functional isocyanate oligomers and multi-functional epoxy oligomers, wherein the ratio of total isocyanate groups to total epoxy groups in the first mixture is in the range of from 0.8 to 1.2, and (b) heating the exposed filament or yarn to a temperature of at least 100 degrees C. whereby the epoxy oligomers and isocyanate oligomers cross-link and form a network on the surface of the filament or yarn, with the proviso that the double bonds present in the epoxy and isocyanate oligomers do not participate in the crosslinking reaction.

This one step process provides coated filaments or yarns that will have an effective bond between the filaments or yarns and the rubber, elastomer or resin.

In another embodiment, there is described a method for treating a synthetic or natural fibrous filament or yarn to improve its adhesion to rubber, elastomer or resin wherein, the method comprises:

(a) exposing the filament or yarn to a first mixture of reagents comprising first multi-functional isocyanate oligomers and first multi-functional epoxy oligomers, wherein the ratio of total isocyanate groups to total epoxy groups in the first mixture is in the range of from 0.8 to 1.2, and (b) heating the exposed filament or yarn at a temperature of at least 100 degrees C. whereby the first epoxy oligomers and first isocyanate oligomers cross-link and form a network on the surface of the filament or yarn, (c) exposing this treated filament or yarn to a second mixture of reagents comprising second multi-functional isocyanate oligomers and second multi-functional epoxy oligomers wherein the ratio of total isocyanate groups to total epoxy groups in the second mixture is in the range of from 0.8 to 1.2, and (d) heating the exposed filament or yarn at a temperature of at least 100 degrees C. whereby the second epoxy oligomers and the second isocyanate oligomers cross-link and form a network on the outer surface of the network formed by the first epoxy and first isocyanate oligomers, with the proviso that the double bonds present in the second epoxy and second isocyanate oligomers do not participate in the crosslinking reaction.

These additional optional steps provide a further enhancement in fiber-to-rubber bond strength.

In some embodiments it is advantageous to further coat the filaments or yarns that have been already coated with the first or first and second reagent mixtures with a catalyst. An exemplary embodiment of this is a method for treating an aromatic polyamide or aromatic copolyamide filament or yarn to improve its adhesion to rubber, elastomer or resin which comprises (a) forming a mixture of reagents comprising multi-functional isocyanate oligomers and epoxy oligomers, wherein the ratio of total isocyanate groups to total epoxy groups in the mixture is in the range of from 0.8 to 1.2, (b) dipping the filament or yarn into the mixture of reagents, (c) removing solvent from the dipped filament or yarn, and (d) dipping the filament or yarn from step (c) into a catalyst whereby the isocyanate oligomers and the epoxy oligomers react to cross-link and form a network on the surface of the filament or yarn, with the proviso that the double bonds present in the epoxy and isocyanate oligomers do not participate in the crosslinking reaction.

A further extension of this process is a method further comprising the steps of:

(a) forming a first mixture of reagents comprising multi-functional first isocyanate oligomers and first epoxy oligomers, wherein the ratio of total isocyanate groups to total epoxy groups in the first mixture is in the range of from 0.8 to 1.2, (b) dipping the filament or yarn into the first mixture of reagents, (c) removing solvent from the dipped filament or yarn, (d) dipping the filament or yarn from step (c) into a catalyst whereby the first isocyanate oligomers and the first epoxy oligomers form a network on the surface of the filament or yarn, (e) forming a second mixture of reagents comprising second multi-functional isocyanate oligomers and second multi-functional epoxy oligomers, wherein the ratio of total isocyanate groups to total epoxy groups in the second mixture is in the range of from 0.8 to 1.2, (f) dipping the filament or yarn previously coated with a first reagent mixture and, optionally, a catalyst into the second mixture of reagents, and (g) dipping the filament or yarn from step (f) into a catalyst whereby the second isocyanate oligomers and the second epoxy oligomers react to crosslink and form a network on the outer surface of the network formed by the first epoxy and first isocyanate oligomers, with the proviso that the double bonds present in the second epoxy and second isocyanate oligomers do not participate in the crosslinking reaction.

The catalysts used with the first and second reagent mixtures may be the same or different. The use of catalyst permits the crosslinking reaction to proceed at room temperature.

Several combinations are possible in how the catalyst may be mixed with the other ingredients. In one embodiment, the catalyst is kept in a first pot with the epoxy and isocyanate reactants in a second pot with the catalyst being added last. In another embodiment, the isocyanate component is in a first pot with the catalyst and epoxy component in a second pot. Preferably, the second pot is the last to be used. In yet another embodiment, the epoxy component is in a first pot with the catalyst and isocyanate component in a second pot. Preferably, the second pot is the last to be used.

EXAMPLES

The aramid cord used in Examples 1, 2, 3, 6 and 7 was DuPont Kevlar®29 cord without finish comprising two twisted 1500 denier plies (1500/1/2 @ 8.7z×8.7s turns per inch with z referring to right-hand twist; s referring to left-hand twist). The cord was washed with methanol to remove any surface residues and then dried in vacuo at 30 degrees C. for two days before use. Three-inch cord sections were employed for the procedures described unless otherwise indicated.

Example 1

The following example demonstrates the room temperature formation of a chlorine-labeled crosslinked network on the surface of an aramid cord from a combination of epoxy and isocyanate reagents and DABCO catalyst and the use of ToF-SIMS analysis to confirm the presence of the chlorine labeled surface network.

A pre-mixed solution of glycidyl glycerol ether (0.69 g, 7.96 mmol epoxy functional groups) and DABCO catalyst (0.020 g, 0.18 mmol) in 0.5 mL 1,4-dioxane was quickly added to another (second) pre-mixed solution of 3-chloropropyl isocyanate (0.24 g, 2.00 mmol) and 4,4'-methylene diphenyl diisocyanate (MDI) (0.75 g, 6.00 mmol isocyanate functional groups) in 3.0 mL 1,4-dioxane. The resulting solution having an isocyanate-to-epoxy molar ratio near 1.00 was mixed and then allowed to stand at room temperature for 30 seconds. Aramid cord sections were hand dipped into the solution for 10 to 15 seconds. The treated cord sections were then removed from the solution and maintained at room temperature for 24 hours to allow the surface coating to cure by crosslinking. The treated cord samples were then washed with methanol to remove any uncured reagents and finally dried in vacuo for an additional 18 hours to eliminate residual volatile components. The treated cord samples prepared in this manner were mechanically stiff when compared to untreated cord that served as a control. ToF-SIMS analysis (operating in the negative mode) of the treated cord clearly showed the presence of chlorine signals at 35 and 37 atomic mass units (intensity ratio 3:1) that were completely absent in the untreated cord control samples.

Example 2

The following example demonstrates the formation of a chlorine-labeled crosslinked network on the surface of an aramid cord from a combination of epoxy and isocyanate reagents followed by thermal curing and the use of ToF-SIMS analysis to confirm the presence of the chlorine labeled surface network.

A solution of glycidyl glycerol ether (0.69 g, 7.96 mmol epoxy functional groups) in 0.5 mL 1,4-dioxane was quickly added to another (second) pre-mixed solution of 3-chloropropyl isocyanate (0.24 g, 2.00 mmol) and 4,4'-methylene diphenyl diisocyanate (MDI) (0.75 g, 6.00 mmol isocyanate functional groups) in 3.0 mL 1,4-dioxane. The resulting solution having an isocyanate-to-epoxy molar ratio near 1.00 was mixed and then allowed to stand at room temperature for 30 seconds. Aramid cord sections were hand dipped into the solution for 10 to 15 seconds. The treated cord sections were then removed from the solution and heated in an oven at 100 C for 15 minutes to allow the surface coating to cure by crosslinking. The treated cord samples were then washed with methanol to remove any uncured reagents and finally dried in vacuo for an additional 18 hours to eliminate residual volatile components. The treated cord samples prepared in this manner were mechanically stiff when compared to untreated cord that served as a control. ToF-SIMS analysis (operating in the negative mode) of the treated cord clearly showed the presence of two chlorine signals at 35 and 37 atomic mass units (intensity ratio 3:1) that were completely absent in the untreated cord control samples.

Example 3

The following example demonstrates the formation and subsequent solvent stabilities of a fluorescent dye labeled crosslinked network formed on the surface of an aramid cord using a combination of isocyanate and epoxy reagents, DABCO catalyst, and a chemically reactive fluorescent probe.

A pre-mixed solution of glycidyl glycerol ether (0.70 g, 8.06 mmol epoxy functional groups) and DABCO catalyst (0.020 g, 0.18 mmol) in 0.5 mL 1,4-dioxane was quickly added to another (second) solution of 4,4'-methylene diphenyl diisocyanate (MDI) (1.06 g, 8.47 mmol isocyanate functional groups) dissolved in 3.0 mL 1,4-dioxane. The resulting solution having an isocyanate-to-epoxy molar ratio near 1.05 was mixed and then allowed to stand at room temperature for 30 seconds. Aramid cord sections were hand dipped into this solution for 10 seconds. The treated cord sections were then removed from the solution and warmed to 35 C for 10 minutes in vacuo to accelerate the crosslinking reaction and to remove residual dioxane solvent. The mechanically rigid cord samples were then hand dipped for 10 seconds into a concentrated N,N-dimethylacetamide solution of Texas Red Cadaverine T2425 fluorescent dye (amine terminated to react with excess isocyanate groups in the crosslinked network and commercially available from Molecular Probes, Life Technologies Corp., Carlsbad, Calif.). The cord sections were removed from the dye solution and then dried in vacuo at 35 C for an additional 24 hours. The rigid cord sections treated in this manner were purple in color and exhibited a deep red fluorescence when exposed to near UV light. The treated cords retained their fluorescent network coatings even when soaked in 1,4-dioxane or N,N-dimethylacetamide (dye solvents) for up to 30 days. Control cord samples lacking a crosslinked network but dipped in the dye solution rapidly lost their fluorescent appearances when exposed to solvents that washed the unbound dye away from their surfaces.

Example 4

The following example demonstrates the DABCO catalyzed, room temperature formation of crosslinked networks or gels in glass reaction vials using different combinations of isocyanate and epoxy reagents including an epoxidized polybutadiene oligomer that contains internal double-bond sites suitable for post-curing into rubber.

Glycidyl glycerol ether and/or poly BD 605E epoxidized butadiene oligomer (commercially available from Cray Valley USA LLC, Exton, Pa.) in varying proportions (7.99 mmol epoxy functional group contents) were dissolved in 1,4-dioxane to give Formulations #1, #2 and #3 as defined in Table 1. DABCO catalyst (0.020 g, 0.18 mmol) was added to each formulation. The resulting formulations were each transferred to an optically clear, glass reaction vial and then treated with 4,4'-methylene diphenyl diisocyanate (MDI) (1.00 g, 7.99 mmol isocyanate functional groups) dissolved in 3.0 mL of 1,4-dioxane followed by rapid mixing. Formulations #1, #2 and #3 were allowed to stand at room temperature and the time for gelation due to crosslink formation was monitored for each. After 24 hours at room temperature, the crosslinked gels were oven dried and then removed from their respective reaction vials for physical inspection.

TABLE 1

| Reagents | Formul. #1 | Formul. #2 | Formul. #3 |
| --- | --- | --- | --- |
| Glycidyl glycerol ether | 0.58 g | 0.34 g | 0 g |
| Poly BD 605E | 0.39 g | 1.20 g | 2.40 g |
| MDI | 1.00 g | 1.00 g | 1.00 g |
| Final wt % solids in 1,4-dioxane | 22% | 26% | 33% |
| Isocyanate-epoxy molar ratio | 1.0 | 1.0 | 1.0 |
| Gel time (min) | 14 | 15 | 25 |
| Physical state after curing 24 h and oven drying | Clear, hard | Clear, rubbery | Opaque, very rubbery |

As indicated in Table 1, the three formulations each cured at room temperature to give crosslinked networks. Gel times were dependent upon the relative amounts of the two epoxy containing reagents employed. As expected, network formation was fastest for Formulation #1 that contained the highest amount of glycidyl glycerol ether relative to the larger epoxy containing butadiene oligomer. This formulation also afforded a crosslinked solid that was mechanically hard and rigid, consistent with its reduced polybutadiene content. In contrast, the crosslinked solid generated from the reaction of MDI with the epoxy containing butadiene oligomer (Formulation #3) was comparatively soft and flexible.

Example 5

The following example demonstrates the DABCO catalyzed, room temperature formation of crosslinked networks or gels in glass reaction vials using different combinations of epoxy and isocyanate reagents including an isocyanate terminated polybutadiene pre-polymer that contains internal double-bond sites suitable for post-curing into rubber.

Three separate solutions containing glycidyl glycerol ether (0.69 g, 7.96 mmol epoxy functional group contents) dissolved in 0.5 mL of 1,4-dioxane were treated with DABCO catalyst (0.020 g, 0.18 mmol). The resulting solutions were each transferred to an optically clear, glass reaction vial and then rapidly mixed with 4,4'-methylene diphenyl diisocyanate (MDI) and/or Krasol LBD 2000 isocyanate terminated butadiene pre-polymer (7.96 mmol isocyanate functional group contents) dissolved in 1,4-dioxane to give Formulations #1, #2 and #3 as defined in Table 2. The three formulations were allowed to stand at room temperature and the time for gelation due to crosslink formation was monitored for each. After 24 hours at room temperature, the crosslinked gels were oven dried and then removed from their respective reaction vials for physical inspection.

TABLE 2

| Reagents | Formul. #1 | Formul. #2 | Formul. #3 |
|---|---|---|---|
| Glycidyl glycerol ether | 0.69 g | 0.69 g | 0.69 g |
| MDI | 1.00 g | 0.96 g | 0.75 g |
| Krasol LBD 2000 | 0 g | 0.32 g | 2.30 g |
| Final wt % solids in 1,4-dioxane | 20% | 21% | 26% |
| Isocyanate-epoxy molar ratio | 1.0 | 1.0 | 1.0 |
| Gel time (min) | 4 | 6 | 14 |
| Physical state after curing 24 h and oven drying | Clear, hard | Opaque, somewhat rubbery | Opaque, very rubbery |

As indicated in Table 2, the three formulations each cured at room temperature to give crosslinked networks. Gel times were dependent upon the relative amounts of the two isocyanate containing reagents employed. As expected, network formation was fastest for Formulation #1 that contained MDI and none of the larger isocyanate terminated butadiene pre-polymer. This formulation also afforded a crosslinked solid that was mechanically hard and rigid, consistent with an absence of butadiene content. In contrast, the crosslinked solid generated from the reaction of glycidyl glycerol ether with a mixture of MDI and the isocyanate terminated butadiene pre-polymer (Formulation #3) was comparatively soft and flexible.

Example 6

This example demonstrates an improved level of adhesion between an aramid cord treated with Formulation #2 from Example 5 and cured rubber using the H-Pull test method ASTM D4776-04, October, 2004.

Treatment of Aramid Cord

Glycidyl glycerol ether and DABCO catalyst dissolved into 1,4-dioxane was rapidly mixed with a separate 1,4-dioxane solution containing a mixture 4,4'-methylene diphenyl diisocyanate (MDI) and Krasol LBD 2000 isocyanate terminated butadiene pre-polymer. The overall composition of this new solution (50 mL total volume) was identical to that listed in Table 2 for Formulation #2 (Example 5). The solution was poured into a beaker and left to stand at room temperature for 60 seconds to allow the early stages of network formation to take place. The viscosity of the solution increased noticeably during this time. An eight foot section of aramid cord was then hand dipped into the beaker containing the solution. Dip time was approximately 10 seconds. The cord coated with the dip solution was carefully pulled from the beaker and then vertically suspended in the air for 24 h at room temperature. The aramid cord treated in this manner was relatively stiff when compared to untreated cord. The weight % pick-up of the crosslinked network on the aramid cord as determined by thermal gravimetric analysis (TGA) was approximately 9 to 10%.

Determination of Adhesion Between Treated Cord and Cured Rubber Using an H-Pull Method H-pull adhesion samples were prepared and evaluated following the general procedure of ASTM D4776-04, October, 2004. Aramid cords treated as described above were cut into 25 inch lengths and tied together at the ends for each set of six samples. Green rubber sheeting was cut into strips using a cutting mold and a cold hydraulic press. The H-Pull samples were prepared using standard molds supplied by DuPont, Richmond, Va. by laying up in order: release cloth strips, rubber strips, Kevlar® aramid cord, rubber strips, and release cloth strips. The protective release films were removed from both sides of the rubber strips as they were laid up into the mold. A weight (200 g) was hung from each 25 inch cord to take up any slack. After positioning the mold top, the entire mold assembly was inserted into a hydraulic press that was pre-heated to 170° C. The press was taken to 16,000 lb and temperature was maintained around 170° C. The mold assembly was held in the press for 5 minutes. The pressure was re-adjusted to 16,000 lb, and then the mold assembly was held in place for an additional 20 minute period. Once pressure was released, the mold assembly was removed from the press and allowed to cool for about 15 to 20 minutes so that the thermally cured rubber samples could be gently pried from the mold. The resulting sample blocks were cut into individual H-pull samples using sharp scissors. Rubber flashing attached to the H-Pull samples was carefully trimmed from the cords with hand-held snips and then gently removed with tweezers to expose the bare cords. In the event that the bare cords were nicked or damaged during the trimming process, the entire H-Pull sample was discarded. All of the H-Pull samples prepared in this manner were aged in the dark at room temperature for at least two full days. An Instron was employed to measure the adhesive strength as the peak load on a sample using special H-pull grips and a 50 lb load cell at a speed of 5 in/min. A similar procedure was carried out separately for an untreated segment of aramid cord to prepare additional H-Pull specimens that served as control samples.

Adhesion Results

Results for four different H-Pull tests using treated and untreated cords are provided in Table 3. The application of the crosslinked network formed from glycidyl glycerol ether, MDI and the isocyanate terminated butadiene pre-polymer to the aramid cord surface resulted in a three-fold improvement in rubber adhesion values relative to the untreated control sample.

TABLE 3

| Aramid Cord | Trial # | Average H-Pull Adhesion (lb-f) |
|---|---|---|
| Treated | 1 (6 samples) | 18.2 |
| Treated | 2 (4 samples) | 17.0 |
| Untreated (control) | 1 (4 samples) | 5.6 |
| Untreated (control) | 2 (5 samples) | 6.1 |

Example 7

The following example demonstrates the room temperature application of a bilayer network structure onto an aramid cord surface by the sequential formation of two separate cured networks using various combinations of epoxy and isocyanate reagents and DABCO catalyst.

Formation of the First (Inner) Network Layer

A pre-mixed solution of glycidyl glycerol ether (0.79 g, 9.11 mmol epoxy functional groups) and DABCO catalyst (0.020 g, 0.18 mmol) in 0.5 mL 1,4-dioxane was quickly added to a second solution of 4,4'-methylene diphenyl diisocyanate (MDI) (1.06 g, 8.47 mmol isocyanate functional groups) dissolved in 3.0 mL 1,4-dioxane. The resulting solution having an isocyanate-to-epoxy molar ratio near 0.93 was rapidly mixed and then allowed to stand at room temperature for 30 seconds. Aramid cord sections were hand dipped into this solution. The dip time was 10 seconds. The treated cord sections were then removed from the solution and maintained at room temperature for 24 hours to allow the surface coating to cure by crosslinking. The resulting cords were relatively stiff and rigid when compared to an untreated (control) section of aramid cord.

Formation of the Second (Outer) Network Layer Over the First (Inner) Network Layer.

A pre-mixed solution of glycidyl glycerol ether (0.69 g, 7.96 mmol epoxy functional groups) and DABCO catalyst (0.020 g, 0.18 mmol) in 0.5 mL 1,4-dioxane was quickly added to another (second) solution containing a mixture of 4,4'-methylene diphenyl diisocyanate (MDI) (1.01 g, 8.07 mmol isocyanate functional groups) and Krasol LBD 2000 isocyanate terminated butadiene pre-polymer (0.32 g, 0.28 mmol of isocyanate functional groups) dissolved in a total volume of 3.0 mL 1,4-dioxane. The resulting solution having an isocyanate-to-epoxy molar ratio near 1.05 was rapidly mixed and then allowed to stand at room temperature for 30 seconds. Aramid cord sections that had been previously coated with the first epoxy-rich network layer described above were then hand dipped into this solution. The dip time was 10 seconds. The treated cord sections were then removed from the solution and maintained at room temperature for 24 hours to allow the new surface coating to cure by crosslinking and to react into the epoxy-rich under-layer. The resulting cords remained relatively stiff and rigid. However, when compared to cord sections coated with only the first network layer, the sections treated with the second (outer) network layer possessed a distinct rubbery feel. This observation is consistent with the formation of a bi-layer coating where the outer layer is enriched with polybutadiene content.

What is claimed is:

1. A method for treating a filament or yarn comprising:
    (a) forming a mixture of reagents comprising multi-functional isocyanate oligomers and epoxy oligomers, wherein the ratio of total isocyanate groups to total epoxy groups in the mixture is in the range of from 0.8 to 1.2,
    (b) dipping the filament or yarn into the mixture of reagents,
    (c) removing solvent from the dipped filament or yarn, and
    (d) dipping the filament or yarn from step (c) into a catalyst whereby the isocyanate oligomers and the epoxy oligomers react to cross-link and form a network on the surface of the filament or yarn, with the proviso that double bonds present in the epoxy and isocyanate oligomers do not participate in the crosslinking reaction.

2. The method of claim 1, wherein the filament or yarn is in a form selected from the group consisting of a cord and a fabric.

3. The method of claim 1 wherein the filament or yarn is synthetic and selected from the group consisting of an aromatic polyamide, an aromatic copolyamide, an aliphatic polyamide and polyester.

4. The method of claim 1 wherein the filament or yarn is natural and is selected from the group consisting of cotton and cellulose.

5. The method of claim 3, wherein the aromatic polyamide is para-aramid.

* * * * *